(12) United States Patent
Skarzenski et al.

(10) Patent No.: US 6,990,837 B2
(45) Date of Patent: Jan. 31, 2006

(54) HIGH THROUGHPUT CAPACITY SPINNER FOR MANUFACTURING DUAL-COMPONENT CURLY FIBERS

(75) Inventors: Joseph Skarzenski, Ottawa (CA); Witold S. Czastkiewicz, Orleans (CA); Stan Banaszkiewicz, Ottawa (CA)

(73) Assignee: Ottawa Fibre Inc., Ottawa (CA)

( * ) Notice: Subject to any disclaimer, the term of this patent is extended or adjusted under 35 U.S.C. 154(b) by 347 days.

(21) Appl. No.: 10/147,717

(22) Filed: May 16, 2002

(65) Prior Publication Data

US 2003/0188557 A1 Oct. 9, 2003

(30) Foreign Application Priority Data

Apr. 4, 2002 (CA) .................................. 2380215

(51) Int. Cl.
C03B 37/04 (2006.01)

(52) U.S. Cl. .............................. 65/521; 65/522; 425/8
(58) Field of Classification Search .................. 65/521, 65/522, 523, 502, 459, 470, 516; 425/8
See application file for complete search history.

(56) References Cited

U.S. PATENT DOCUMENTS

| | | |
|---|---|---|
| 2,927,621 A | 3/1960 | Slayter et al. |
| 2,998,620 A | 9/1961 | Stalego |
| 3,073,005 A | 1/1963 | Tiede |
| 3,236,616 A | 2/1966 | Stalego et al. |
| 3,304,164 A | 2/1967 | Charpentier et al. |
| 4,145,199 A | 3/1979 | Russell |
| 4,203,745 A | 5/1980 | Battigelli et al. |
| 4,203,746 A | 5/1980 | Battigelli et al. |
| 4,203,748 A | 5/1980 | Battigelli et al. |
| 4,203,774 A | 5/1980 | Battigelli et al. |
| 4,636,234 A * | 1/1987 | Huey et al. .................... 65/437 |
| 4,689,061 A | 8/1987 | Britts, II et al. |
| 5,118,332 A | 6/1992 | Hinze |
| 5,468,275 A | 11/1995 | Lin et al. |
| 5,474,590 A | 12/1995 | Lin |
| 5,482,527 A * | 1/1996 | Czastkiewicz ............... 65/502 |
| 5,509,953 A * | 4/1996 | Gavin ......................... 65/502 |
| 5,514,199 A | 5/1996 | Houpt |
| 5,529,596 A | 6/1996 | Loftus et al. |
| 5,536,550 A | 7/1996 | Houpt et al. |
| 5,582,841 A | 12/1996 | Watton et al. |
| 5,591,459 A * | 1/1997 | Snyder .......................... 425/8 |
| 5,595,766 A | 1/1997 | Houpt et al. |
| 5,618,328 A | 4/1997 | Lin et al. |
| 5,629,089 A | 5/1997 | Berdan, II et al. |
| 5,647,883 A | 7/1997 | Houpt et al. |
| 5,672,429 A | 9/1997 | Berdan II et al. |
| 5,702,658 A | 12/1997 | Pellegrin et al. |
| 5,723,216 A | 3/1998 | Houpt et al. |

(Continued)

Primary Examiner—Steven P. Griffin
Assistant Examiner—Lisa Herring
(74) Attorney, Agent, or Firm—Hollander Law Firm, P.L.C.

(57) ABSTRACT

A spinner and a distributor spinner cup fixedly nested within the spinner are adapted to receive two molten thermoplastic materials of different coefficients of thermal expansion to produce a dual-component glass fiber insulation product. The inside wall of the spinner peripheral side wall is adapted to receive, through horizontal slots adjacently vertically disposed, first and second molten thermoplastic materials and centrifuge same into horizontal annular non-interrupted circumferential cavities disposed above and below one another. Passages lead from exit orifices in each cavity outwardly at differing angles. Passages from first and second thermoplastic material cavities join with one another at orifices on an outer side of the peripheral side wall.

21 Claims, 6 Drawing Sheets

U.S. PATENT DOCUMENTS

| | | |
|---|---|---|
| 5,743,157 A | 4/1998 | Hinze |
| 5,743,932 A | 4/1998 | Houpt et al. |
| 5,770,309 A | 6/1998 | Houpt et al. |
| 5,779,760 A | 7/1998 | Watton et al. |
| 5,785,996 A | 7/1998 | Snyder |
| 5,786,082 A | 7/1998 | Evans et al. |
| 5,968,645 A | 10/1999 | Caccini et al. |
| 5,987,928 A | 11/1999 | Bernard et al. |
| 6,128,929 A | 10/2000 | Peterson et al. |
| 6,167,729 B1 | 1/2001 | Watton et al. |
| 6,245,282 B1 | 6/2001 | Baker et al. |
| 2004/0112093 A1 | 6/2004 | Beaufils et al. |
| 2004/0144706 A1 | 7/2004 | Beaufils et al. |

* cited by examiner

HIGH THROUGHPUT CAPACITY SPINNER FOR MANUFACTURING DUAL-COMPONENT CURLY FIBERS

This application claims priority of Canadian patent application 2,380,215 filed Apr. 4, 2002.

General field of this invention is a method and apparatus for manufacturing dual-component fibers from thermoplastic materials, such as glass or some other mineral or polymer materials, by using a rotary fiber forming process. More particularly this invention belongs to a category of devices for centrifuging dual-component curly glass fibers, where the fibre curl is the result of distinct differences in some physical properties or parameters of the two separate glasses. A most common approach is to utilize two unique glass formulations with a significant difference in their coefficients of thermal expansion.

Typical glass fibre thermal or acoustical insulation product is made of rather short, single glass and basically straight glass fibers. Common method of manufacturing these glass wool type fibers is a rotary fiberizing process, where a single molten glass composition is forced by a high speed rotation through the orifices in the peripheral wall of a centrifuge, usually referred to as a spinner, and is further subjected to the combined action of a high temperature flame and low temperature/high velocity compressed air blasts.

It has been recognized some forty years ago that curly or non-straight glass fibre geometry should in principle offer many insulation product advantages. Some of these highly desired product attributes include: substantially higher allowable product compression ratio, offering substantial cost savings in product storage and transportation (distribution), also in packaging materials; better volume filling ability; lower dust level; less itch; potential for much lower organic binder level required to assure product integrity, lower binder cost; reduced organic emissions. One can also reasonably expect a slightly higher product thermal resistance, meaning possibility of increased earnings due to consequential density reductions. All of these expectations, to a varying degree, have turned out to be true.

The very first attempts to make curly glass fibre were made by Owens-Corning in the 60's. Slayter et al. in U.S. Pat. No. 2,927,621 discloses the production of curly glass fibers by passing a continuous single glass composition fibre through opposed contoured skirts. However, this thick and long fibre is unsuitable for insulating products. Tiede in U.S. Pat. No. 3,073,005 discloses a non-rotary fiberizing process for making bicomponent curly glass fibre; two glasses with differing thermal expansion coefficients are put into side by side contact. This bicomponent curly fibre was not meant to be used for insulation products. Some other patents disclosing methods of making curly or kinky glass fibers are disclosed in U.S. Pat. Nos. 3,236,616 and 4,145,199, but still these methods are not that practical for making insulation product.

It is generally accepted that a non-rotary fiber forming process can not effectively compete with the rotary one for the economic manufacture of a typical glass fibre insulating product, because of a substantially lower throughput capacity and too coarse fibre to make a good glass wool. As a consequence, some methods of imparting kink by pulling fibre from a textile bushing and mechanically crimping it by passing fibre, while still in a hot state, through a series of opposed intermeshing gears are not a viable option.

Stalego in U.S. Pat. No. 2,998,620 discloses a rotary method for making bicomponent curly glass fibers, where two glass compositions differ in thermal expansion coefficients. There is no mention of using these curly fibers for insulation products.

In 1995, Owens-Corning obtained patents for a new technology of manufacturing bicomponent curly fibre by a rotary fiberizing technique. The clear objective was to use this fibre for thermal insulation products. The scope of patenting is wide, including process, apparatus and product. Some other major manufacturers of fibre glass insulation (Isover Saint Gobain and Johns-Manville) were also granted some patents in this field.

A typical approach to manufacture curly bicomponent glass fibre by a rotary fiberizing, is to use two glass formulations with widely different coefficients of thermal expansion; and then feed these two glasses as separate glass streams, in a radially displaced configuration, into some sort of integrated glass distributor inside a spinner assembly; force first and second glasses into alternate vertical compartments circumferentially spaced around the interior of the spinner peripheral wall, and finally centrifuge these two glasses through orifices drilled in the spinner peripheral wall along the adjacent compartments dividing line such that the two glasses join each other in side to side contact before emerging from a single orifice as a bicomponent fibre.

Clearly, there is a need for increasing throughput capacity of these dual-glass spinners; U.S. Pat. Nos. 5,468,275, 5,474,590 and 5,595,766 disclose some possible ways of addressing the capacity issue by using elongated orifices, slanted rather than vertical glass compartments and multiple exits for each inlet, respectively.

Some other areas of concern in the development process of highly effective and practical dual-glass spinner designs include some aspects of strengthening spinner structure by using some more specialized alloys and spinner forming methods (U.S. Pat. No. 5,743,157). Modified spinner geometries are adapted for radial balancing during the centrifuging operation, and as such less prone to thermally induced spinner geometry deformations (U.S. Pat. Nos. 5,582,841 and 6,167,729 B1), and simplified fiberizing orifice configurations, i.e., replacing a typical Y- or V-shaped hole configurations with radially drilled ones. These are less expensive to drill, offering reduced hole wear and extended dual-glass spinner service life (U.S. Pat. No. 5,987,928).

The object of the present invention is to provide a dual-glass spinner for manufacturing quality bicomponent curly glass fibre at high production rates, i.e., at a throughput capacity in principle comparable with that for a standard single-component spinner of the same diameter.

The present invention approach to deal with the dual-glass spinner fiberizing throughput issue is to use horizontal rather than a vertical arrangement of glass compartments on the inside of the spinner peripheral wall, and combine it with a unique hole drilling concept, so the resulting dual-glass hole pattern, as seen on the spinner face from the outside, is basically the same staggered, dense and uniform hole pattern as for a single-glass spinner; both in general appearance (excluding the exit orifice somewhat oval shape) and the total number of holes per spinner (spinner hole count).

Horizontal flanges or baffles serve also as effective stiffeners or stiffening ribs, adding some mechanical integrity and extra strength to the dual-glass spinner structure, particularly against spinner face deformation.

Clearly, in the present invention, there are numerous possibilities. Generally speaking two major paths emerge, namely: use bicomponent curly fibre alone, or in a combination with some other fibre(s), not necessarily glass fibre.

Owens-Corning manufactures attic and crawlspace thermal insulation. This is a binderless, plastic sleeve enclosed product, entirely made of bicomponent curly Miraflex(*) glass fibre. There are also U.S. patents disclosing thermal insulation products being a blend of straight single-glass and curly dual-glass fibers, cf. U.S. Pat. No. 5,968,645.

A mixture of single-glass straight fibre with a dual-glass curly fibre can be made off-line, particularly for a loose-fill type insulation. Certainly making it during the fibre manufacturing process is the preferred way of doing it. On a typical multi-spinner line, a mixed single-glass/dual-glass thermal insulation product can be made by a proper sequencing of standard single-glass and dual-glass spinners.

Thermal insulation material made as a mixture of single-glass straight and dual-glass curly fibers is expected to allow for substantially higher compression ratios during the product packaging stage, since a curly fiber component certainly can offer some extra springiness to the product, and this results in a better thickness recovery after compression release. It is likely that less binder will be needed to assure a required level of product integrity. Curly fibre has a better volume filling ability than a so called straight one, and naturally allows for some degree of fibre interlocking, mutual entanglement and self-cohesion. Slightly reduced thermal conductivity and therefore potential for some density reduction, is possible. Skin irritation and product dustiness, which are factors particularly important to product end-users or installers, should in principle be less pronounced as well.

SUMMARY OF THE INVENTION

The object of the present invention is to provide a dual-glass spinner for manufacturing bi-component curly glass fibers at a production rate in principle comparable with the single-glass spinner operation. A mixed dual-glass/single-glass fibre insulation product can be made with a substantially improved allowable compression ratio, as determined by the minimum required thickness recovery after unpacking, much reduced binder content, and somewhat improved thermal insulation value.

The inventors have produced a spinner for use in producing a bi-component fibreglass insulation product, including an interior slinger cup; said slinger cup being circumferentially secured in a fixed manner to a bottom of said spinner inwardly of said spinner periphery; said slinger cup having a bottom portion extending inwardly and being adapted to receive a first molten glass A which, through centrifugal movement, forces said glass A in an outward direction; said slinger cup further comprising a vertically extending circumferential wall and an upper horizontally extending flange adapted to receive a second stream of molten glass B with a different coefficient of thermal expansion than said first glass A; said glass B being forced outwardly through centrifugal movement; said spinner having a plurality of vertical baffles creating vertical chambers inwardly of a spinner peripheral wall; said slinger cup having a plurality of openings on an outwardly facing wall, such that glass A emerges into first of said vertical chambers and glass B emerges above said slinger cup horizontal flange into second alternative vertical chambers; said chambers being greater than 2 in number and lesser than 32 in number; said spinner further comprising a plurality of horizontal baffles disposed between said vertical chambers such that glass A and glass B enter separately from said vertical chambers between said baffles; said baffles creating alternate vertically disposed horizontal chambers; said spinner on its inner periphery wall having a plurality of apertures adapted to receive glass A from one horizontal chamber and glass B from an alternative upper or lower horizontal chamber; said apertures opening into either glass A or glass B channels; whereupon in operation each one of glass A channels and each one of glass B channels connects to a single common orifice through the spinner exterior peripheral wall; said spinner wall having a large number of orderly placed, single common orifices, thereby creating a bi-component primary glass fibre, which, after further attenuation by a combined action of a rotating spinner, external main burner and compressed air blower create curly irregularly shaped glass fibers, due to glass A and B having different coefficients of thermal expansion.

BRIEF DESCRIPTION OF THE DRAWINGS

The invention will be more clearly described in conjunction with the accompanying drawings wherein:

FIG. 8A is section 1—1; 8B is section 2—2; and 8C is section 3—3 which show the channels through which the glass passes at various angles.

DETAILED DESCRIPTION OF THE INVENTION

Figure 1A:
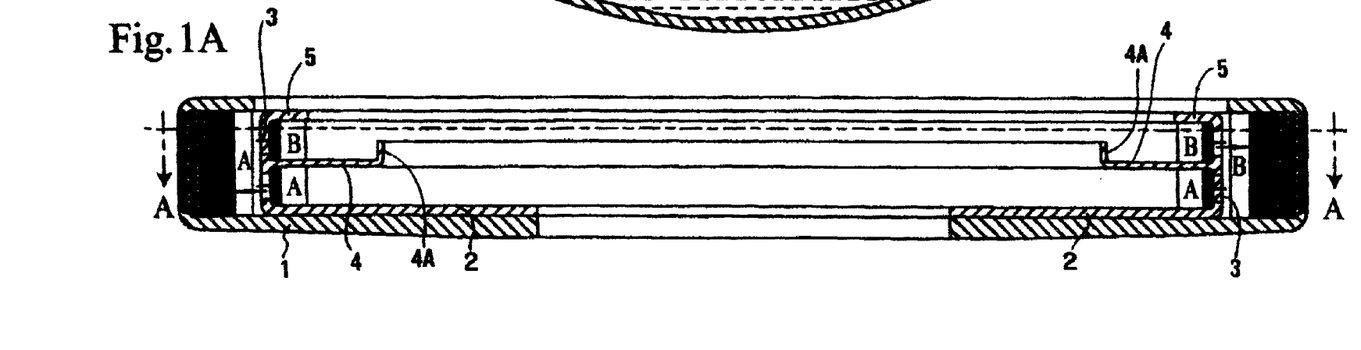
FIG. 1A is a transverse cross section of a spinner used in the present invention.

FIG. 1A is a transverse cross section of a spinner used to produce glass fibers through centrifugal force, heat, and air pressure. The spinner 1 is basically a round dish having a peripheral circumference with holes drilled therein. The spinner has an upper top side flange but otherwise has an open top which permits molten glass to enter into the spinner and be forced to the circumference. In FIG. 1A there is mounted within the spinner a slinger cup 2. The slinger cup is fixedly mounted within the spinner. It has a peripheral wall or rim 3, a slinger cup middle flange 4, and a middle flange upturned member 4A. The slinger cup also has a top flange 5. The purpose of the slinger cup is to separate two molten glasses A and B. Molten glass B is directed into the slinger cup on top of the middle flange 4 whereas molten glass A falls inside the spinner 1 inwardly of the slinger cup middle flange upturned member 4A.

Figure 2:
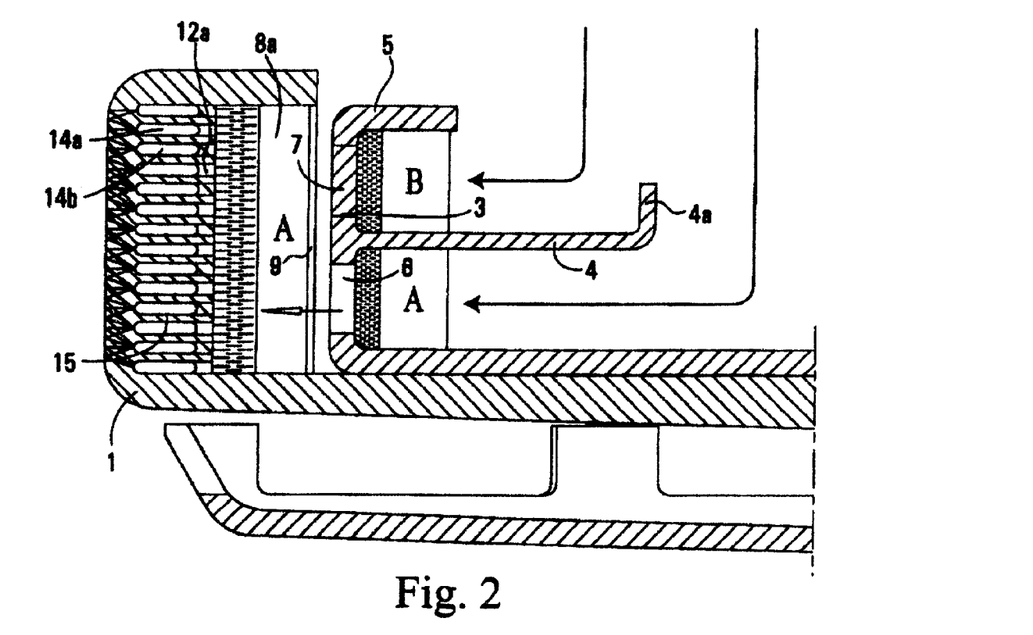
FIG. 2 is an expanded view of one side of a transverse cross section of the spinner.

On examination of FIGS. 1A and 2, one views that a molten stream of glass B descends upon the slinger cup middle flange 4 while glass A falls to the bottom of slinger cup 2 and exits through glass A slots 6. Glass B, on the other hand, exits through glass B slots 7.

Figure 1B:
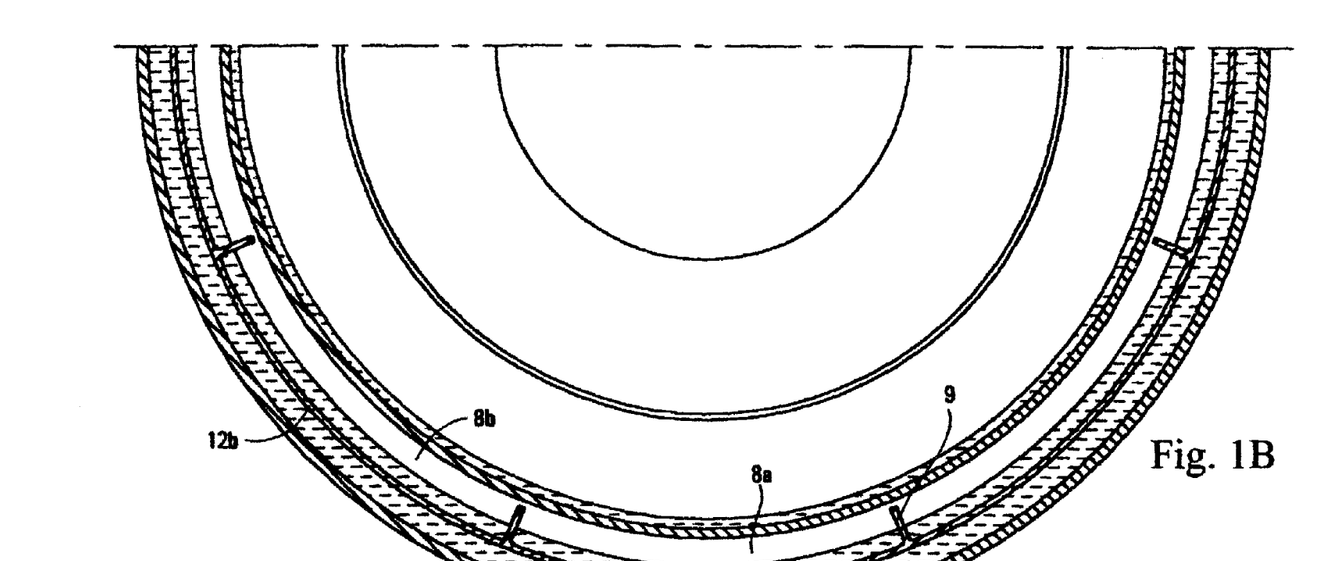
FIG. 1B which is an A—A cross-section of FIG. 1A is a top view of the spinner showing one half of the total circumference.

As can be seen in FIG. 1B, the periphery of the spinner on the exterior side of the slinger cup 2 is divided into a number of chambers separated from one another by vertical baffles 9. In a preferred embodiment, eight circumferential compartments are used, four for glass A and four for glass B. Hence, around the circumference of the slinger cup, glass B, directed through holes 7, is directed to vertical chambers 8b and glass A is directed to alternate vertical chambers 8a. From chambers 8a and 8b, the molten glass is permitted to pass towards the periphery of spinner 1 by means of slots 12a for glass A, and 12b for glass B. Only those chambers marked as 8a permit the passage of glass A glass towards the periphery and only those chambers marked as 8b, i.e. the alternate circumferential chambers, permit glass B to pass towards the periphery. Before proceeding further, it is noteworthy in FIG. 4 that the spinner bottom is marked as 11 and the spinner top as 10. Slots 12a and 12b, which are directed radially outwardly, are separated by ring-shaped internal horizontal flanges. Thus, glass A has access only to those slots 12a and glass B has access only to those slots 12b. Within the peripheral wall, however, glass A slots pass towards circumferential cavities 14a and glass B passes through to circumferential cavities 14b.

Figure 3:
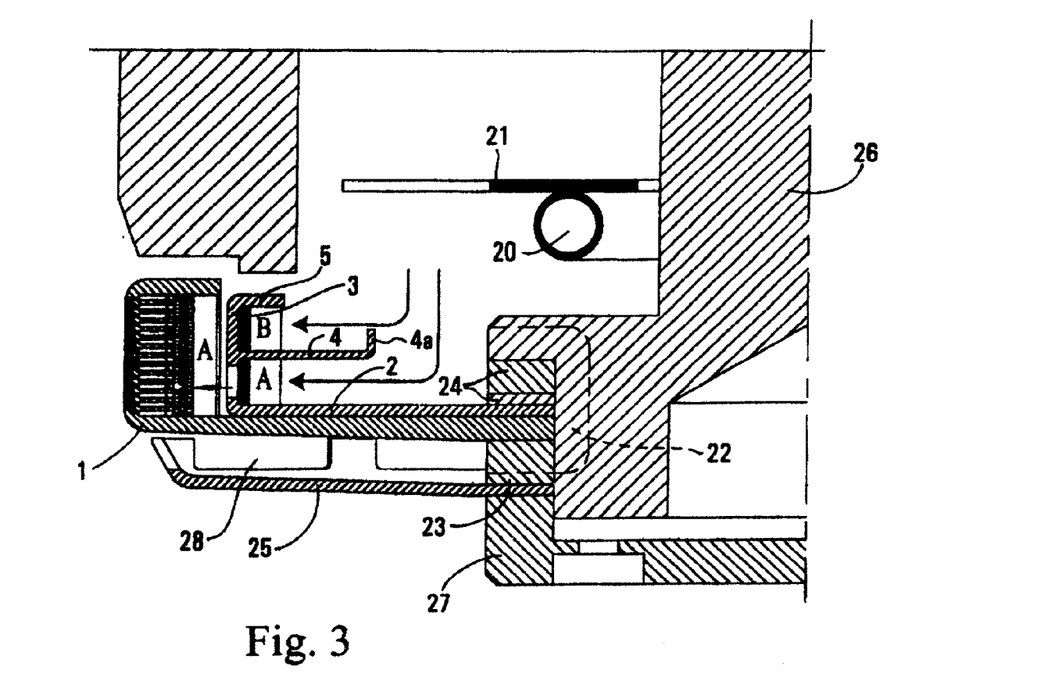
FIG. 3 is a transverse cross section of approximately one half of the spinner with other components.

Before proceeding with the essence of the invention, i.e. the peripheral hole formation, one must understand in FIG. 3 the basic components of the spinner mechanism. The spinner 1 turns at approximately 2400 r.p.m. In order to keep the molten glass at a sufficiently high temperature, there is an inner burner 20 and an inner burner deflector ring 21. Spinner 1 is attached to a mounting hub 26 having a mounting cap 27. Mounting hub 26 has a number of peripheral radially milled, and uniformly circumferentially spaced grooves or slots 22 to provide flow channels for allowing inner burner combustion products to communicate with the space right underneath spinner bottom. Spinner 1 has a slotted bottom radiation shield 25 to contain the heat upwards.

Separating the slotted bottom radiation shield 25 from the spinner 1 is a slotted spacer ring 23. Spinner 1 is also equipped with a number of spinner elevation adjustment spacers for adjusting the spinner in relation to the mounting hub 26. Between the slotted bottom radiation shield 25 and the spinner bottom are a number of bottom radiation shield exit slots 28. Mounting cap 27 mounts the spinner 1 to the mounting hub 26 by means of bolts.

Figure 4:
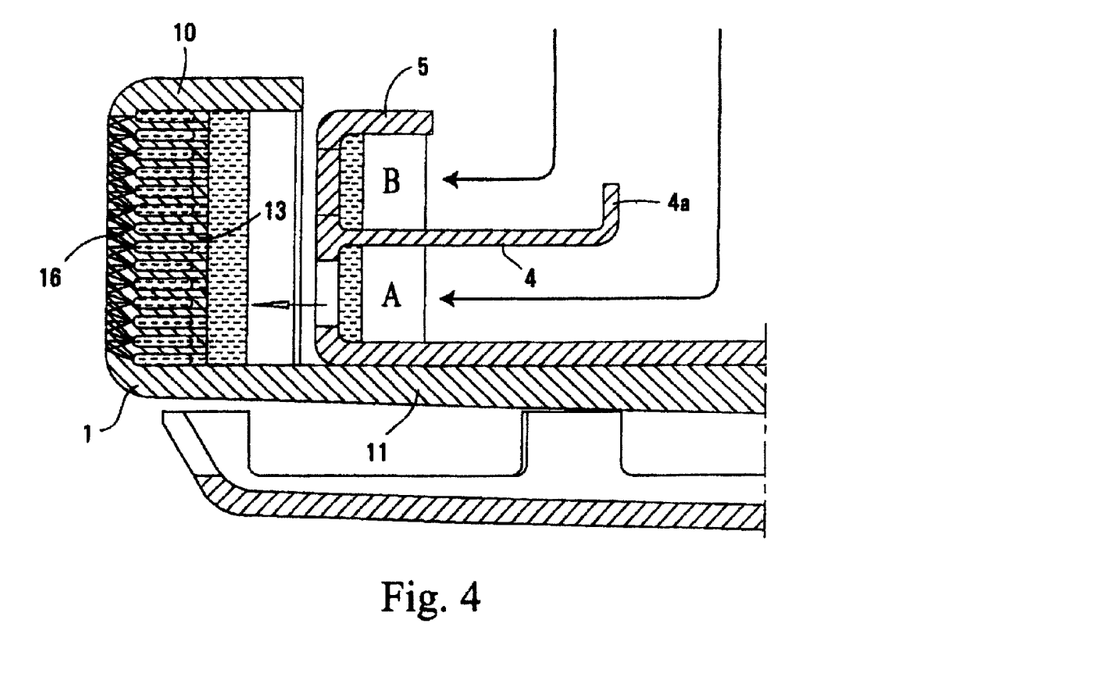
FIG. 4 is similar to FIG. 2 with different components shown.
Figure 5:
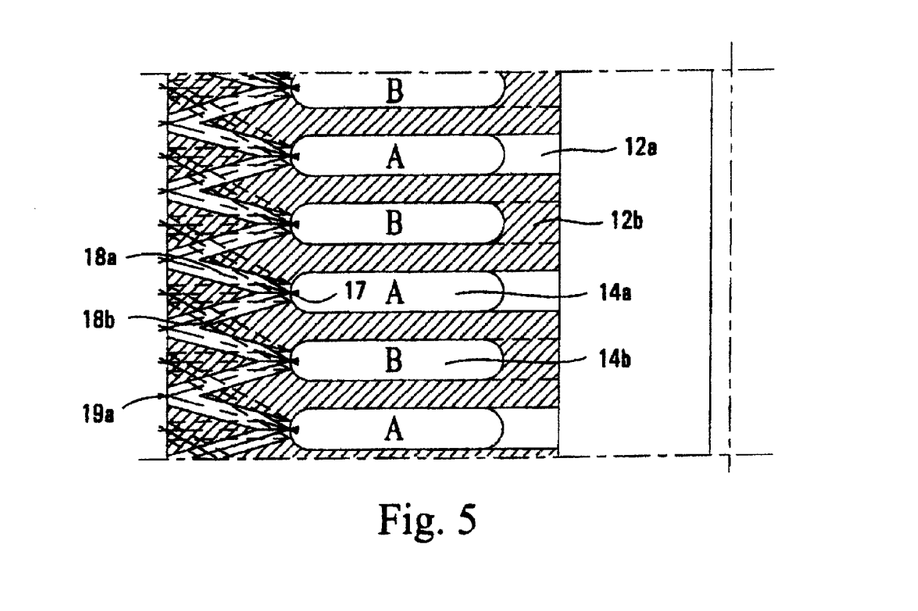
FIGS. 5 and 6 are expanded views of the transverse cross section of the spinner's interior and exterior peripheral walls.

In FIG. 4, the spinner 1 has an inner peripheral wall 13 and an outer peripheral wall 16. As previously mentioned, when glasses A and B enter the peripheral wall through slots 12a and 12b, which are separated by horizontal flanges 15. Within the circumferential wall are glass A circumferential rings 14a and glass B circumferential rings 14b. Thus, as shown more clearly in FIG. 5, glass B and glass A are alternately permitted to enter through the circumferential wall bounded by inner peripheral wall 13 and outer peripheral wall 16.

Figure 6:
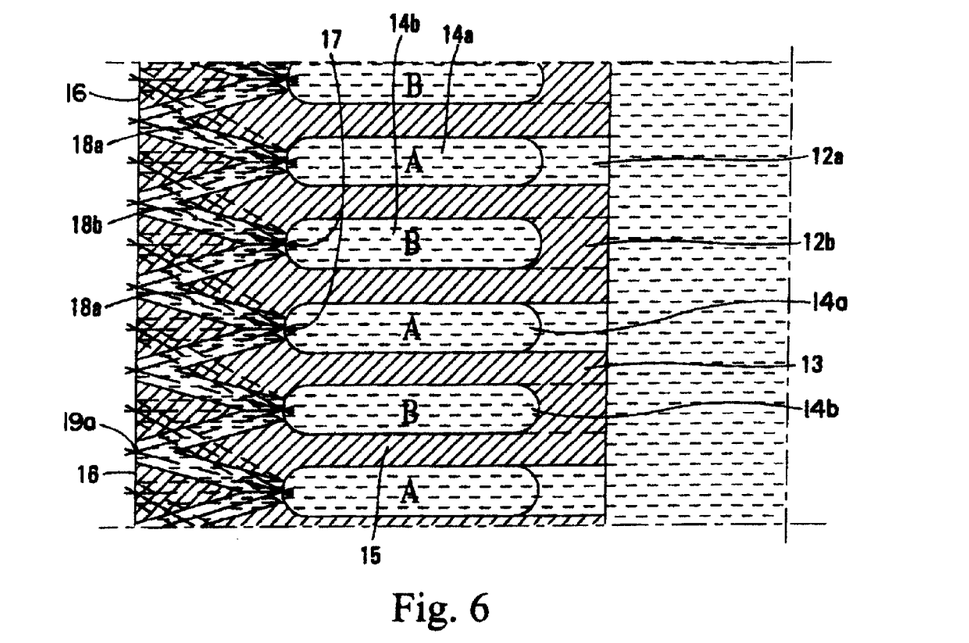
Figure 7:
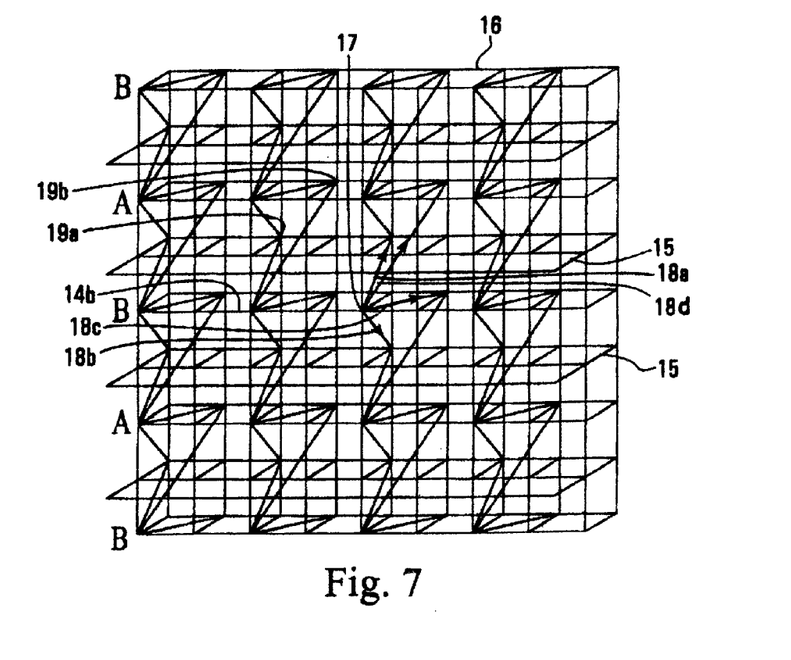
FIG. 7 is a perspective view from the inside of the spinner peripheral wall showing a hole drilling pattern.

FIG. 6 shows more closely the inner peripheral wall 13 and the outer peripheral wall 16 of the spinner. Slots 12a and 12b enter through the inner peripheral wall 13 and then become cylindrical cavities for glass A and glass B shown as 14a and 14b, respectively. Separating these horizontally radially outwardly projecting cavities are horizontal flanges 15.

As glass A progresses outwardly through cylindrical cavities 14a, it enters an inlet hole 17 on the inside of the outer peripheral spinner wall 16. Similarly, as glass B progresses outwardly through cylindrical cavities 14b, it also enters an inlet hole 17. From common inlet holes 17, in a preferred embodiment, a plurality of channels emerge, some lead outwards radially and some are angularly slanted and lead outwards.

In a preferred embodiment there are four such channels generally labeled, as is shown in FIGS. 6, 7, 8 and 9 as 18a, 18b, 18c and 18d. The outer side of peripheral wall 16 is equipped with a plurality of orderly placed holes 19a for outlet hole type A and 19b for outlet hole type B. Through this innovative configuration of slanted and radially outward channels, both glasses A and glasses B emerge from outer peripheral wall 16 through orifices 19a and 19b, together side by side. Because of their different coefficients of thermal expansion, the two glasses shrink upon cooling to a different degree thus forming curly or irregularly shaped fibers which are then directed downwardly and collected on a foraminous belt conveyor equipped with suction.

Drawings 8A, 8B, 8C and 9A, 9B and 9C show various configurations through different views, wherein glass A and glass B are lead through inlet holes 17 and the unique configuration of slanted and radially drilled channels which result in a uniform surface density, staggered and high hole count pattern of exit holes 19a and 19b on spinner surface, highly resembling or even matching a typical drilled hole configuration for the conventional single-glass spinners.

Figure 8A:
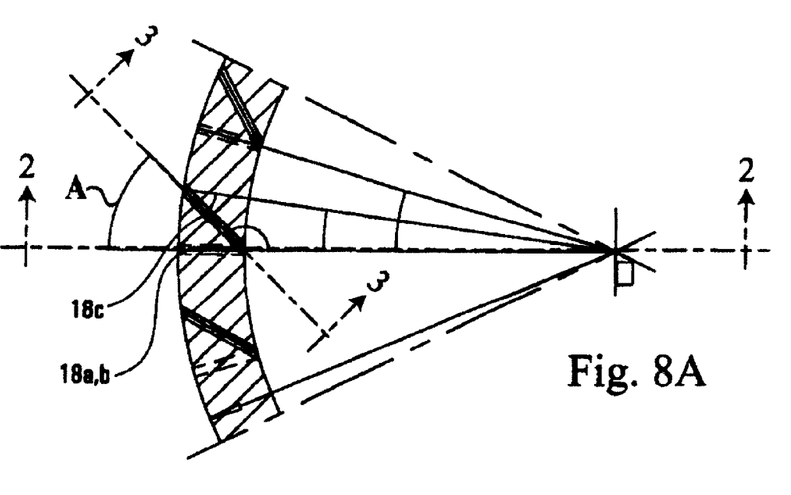

In FIG. 8A, angle A is shown as the angle between two planes, i.e. the angle between radial channels and radially inclined channels.

Figure 8B:
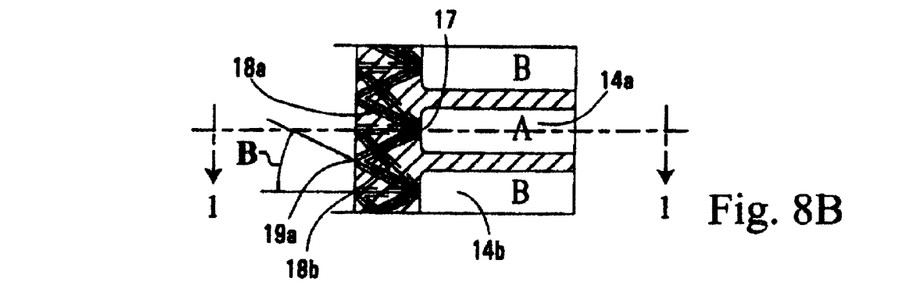

In FIG. 8B, angle B is the angle between flow channels in the radially inclined plane and a perpendicular to the spinner axis is between 15 and 60 degrees.

Figure 8C:
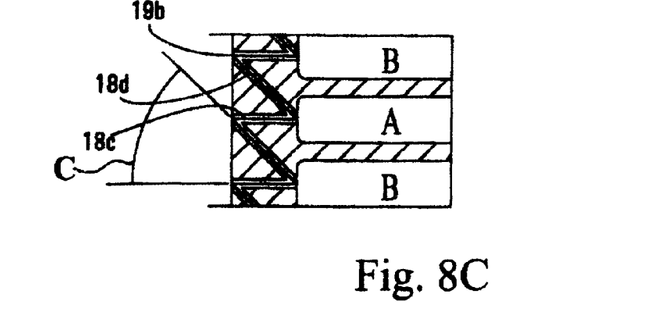
Figure 9A:
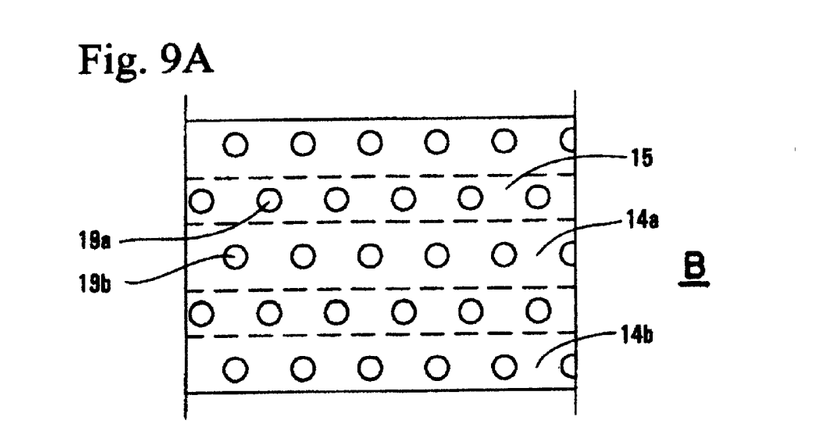
FIGS. 9A and 9C are respectively the view B and the cross-section A—A of FIG. 9B, showing the hole drilling patterns as seen from the outside and from the inside of the spinner.
Figure 9B:
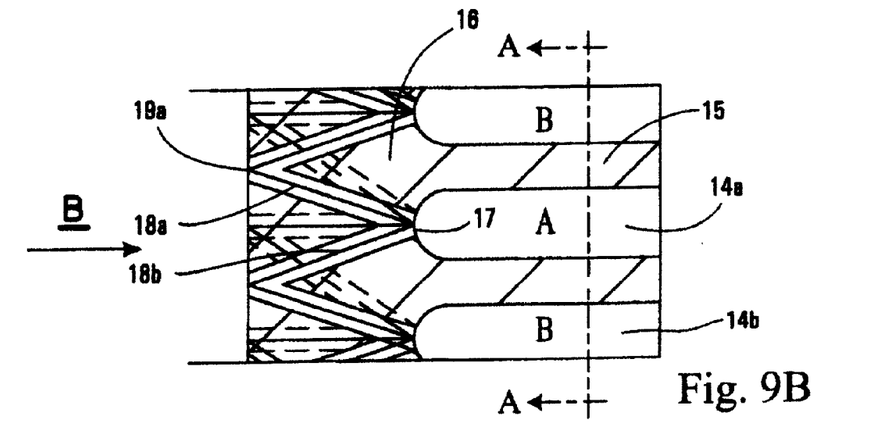
FIG. 9B is a repeated FIG. 8B, given here as a reference for easier visulization.
Figure 9C:
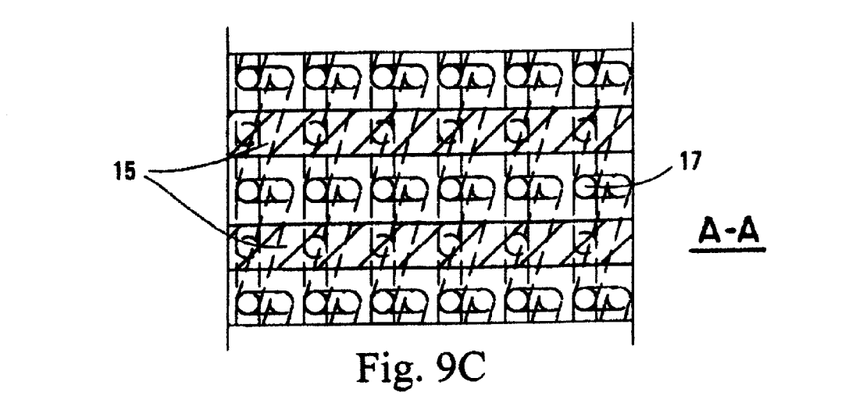

In FIG. 8C, the angle C is the angle between the flow channels in the radially inclined plane and is between 25 and 75 degrees.

The essence of the invention is a multiple, horizontal and alternate layering of glasses A and B along the height of inner surface of the spinner peripheral wall, combined with extruding them through the unique geometry of channels 18a, 18b, 18c and 18d, drilled in spinner peripheral wall in such a way that the exit hole pattern for a dual-glass spinner is virtually the same as, or largely resembles the one used for a standard single-glass spinner of the same diameter. Although a preferred embodiment of the invention has been discussed, it is to be understood that the essence of the invention is to create a dual glass fibre or a bi-component fibre of a twisted or curly nature in high capacity output through the manipulation of vertical and horizontal flanges and a plurality of outgoing channels from glasses A and B which come together side by side through outlet hole type 19a and outlet hole type 19b.

The invention claimed is:

1. A spinner for use in producing a bi-component fiber containing fiberglass insulation product including an interior distributor spinner cup; said distributor spinner cup being secured in a fixed manner to a bottom of said spinner inwardly of a peripheral side wall of said spinner; said cup having a bottom wall adapted to receive a first molten glass A and move said glass A in an outward direction; said cup further comprising a vertically extending circumferential wall and an upper horizontally extending flange adapted to receive a second stream of molten glass B with a different coefficient of thermal expansion than said first glass A; said glass B being forced outwardly through centrifugal movement; said spinner having a plurality of vertical baffles creating vertical chambers inwardly of said spinner peripheral side wall; said cup having a plurality of openings in said vertically extending circumferential wall, such that glass A emerges into first of said vertical chambers and glass B emerges above said cup horizontal flange into second alternative vertical chambers; said chambers being greater than 2 in number and lesser than or equal to 32; said spinner peripheral side wall further comprising a plurality of horizontal slots such that glass A and glass B enter separately from said vertical chambers into said slots; said slots communicating with alternate vertically disposed annular horizontal cavities; each said cavities having a plurality of apertures adapted to receive either alternatively glass A from one horizontal cavity and glass B from an alternative upper or lower horizontal cavity; said apertures opening respectively into either glass A or glass B channels leading to an exterior wall surface of said peripheral side wall whereupon in operation each one of glass B channels connects to a single common orifice with a glass A channel through said exterior wall surface of said peripheral side wall; said exterior wall surface having a large number of said single common orifices, thereby creating in operation dual component curly shaped glass fibers.

2. A spinner as claimed in claim 1 wherein said peripheral said wall includes a plurality of channels between an inside surface of said side wall and an outside surface of said side wall; said channels permitting molten glass to pass through said peripheral side wall; the number of said channels originating through each of first and second single glass inlet holes being four in number; one of said channels of each of said first single glass inlet holes being positioned to join one channel of said single second glass inlet holes to exit through dual glass exit holes in said outside surface of said side wall.

3. A spinner as claimed in claim 2 wherein pairs of said channels reside in two distinct planes; two of said channels being in a spinner radial plane; and two of said channels being in a radially inclined plane parallel to a spinner axis.

4. A spinner as claimed in claim 3 wherein one channel in said radially inclined plane resides in a plane perpendicular to said spinner axis.

5. A spinner as claimed in claim 4 wherein an intersection of said channels in said radially inclined plane with said spinner outside peripheral wall lies between an intersection of two nearby radial plane channels.

6. A spinner as claimed in claim 5 wherein an angle between said spinner radial plane channels and radially inclined plane channels parallel to a spinner axis from said inlet holes is between 5 to 30 degrees.

7. A spinner as claimed in claim 6 wherein said angle is 5 to 20 degrees.

8. A spinner as claimed in claim 6 wherein said angle is between 7.5 and 15 degrees.

9. A spinner as claimed in claim 6 wherein an angle between channels in said radially inclined plane is between 25 and 75 degrees.

10. A spinner as claimed in claim 9 wherein the angle between flow channels in said radially inclined plane and a perpendicular to the spinner axis is between 15 and 60 degrees.

11. A spinner as claimed in claim 2 wherein a diameter of all four channels originating from said inlet holes is equal.

12. A spinner as claimed in claim 2 wherein said dual glass exit holes are not uniform from top to bottom of said spinner outer peripheral wall.

13. A spinner as claimed in claim 2 wherein said dual glass exit holes are staggered and fully symmetrical.

14. A spinner as claimed in claim 2 wherein said dual glass exit holes are staggered and partially offset to one side.

15. A spinner as claimed in claim 1 adapted to produce a dual component fiberglass product; said spinner including an exterior peripheral side wall with a dense, staggered and uniform hole pattern.

16. An apparatus for making dual component glass fibers comprising:
a spinner having a bottom wall, a circumferential peripheral side wall, and an upper horizontally disposed top flange;
said apparatus including equipment for supplying first and second molten materials to a distributor spinner cup located within said spinner;
said spinner further comprising a plurality of vertically oriented flanges circumferentially placed about an inner surface of said peripheral side wall;
said vertically oriented flanges extending radially inwards and terminating adjacent to an outer side of a vertically disposed peripheral wall of said distributor spinner cup, thereby providing a plurality of vertically oriented compartments;
said distributor spinner cup also including a bottom wall fixedly attached to said bottom wall of said spinner, and a horizontally disposed mid-flange extending inwardly from said vertically disposed peripheral side wall;
said mid-flange including an upturned vertically disposed circumferential end flange, and said distributor spinner cup having a horizontally disposed top flange extending radially inwardly from the top of said vertically disposed peripheral side wall;
said distributor spinner cup mid-flange being adapted to receive a second molten B glass stream and, in operation, through rotation, centrifugally move said glass B stream to an inner side of said peripheral wall of said cup, above said mid flange through a plurality of horizontally disposed apertures openly connected to every second adjacent vertically oriented compartment;
said spinner distributor cup bottom wall being adapted to receive a first molten glass stream A and, in operation, through rotation, centrifugally move on said first molten glass stream A to said inner side of said peripheral side wall of said distributor spinner cup below said mid-flange through a plurality of horizontally disposed apertures openly connected to every first adjacent vertically oriented compartment;
said spinner peripheral side wall having an inner wall, an inner interior wall portion, an outer interior wall portion, located outwardly of said interior wall portion and an outer wall;
said inner wall and said inner interior wall portion of said spinner peripheral side wall having a plurality of first horizontal open slots, adapted to receive glass A from glass A vertical compartments, and vertically disposed upwards or downwards adjacently a plurality of second horizontal slots adapted to receive glass B from glass B vertical compartments, thus said horizontal slots are stacked upwardly and downwardly with adjacent molten glass streams of A and B glass;
each glass stream A exits outwardly to an annular, non-interrupted, horizontally-disposed cavity located circumferentially within said inner interior wall portion of the spinner peripheral side wall;
and each glass stream B exits outwardly to an annular upper or lower adjacent, non-interrupted, horizontally-disposed cavity located circumferentially within said inner wall portion of the spinner peripheral side wall;
each of said cavities containing said A and B glasses, includes a plurality of exit orifices, each of which communicates with a plurality of passages extending outwardly within said outer interior wall of said spinner peripheral side wall which join together as A & B combined glass streams and exit through common orifices in said outer wall of said spinner peripheral side wall to form in operation, dual-component helical, curly glass fibers of two glasses of differing coefficients of thermal expansion.

17. An apparatus as claimed in claim 16, wherein each exit orifice in said cavities of said A and B glasses communicates with at least three of said passages extending outwardly within said outer interior wall of said spinner peripheral side wall.

18. An apparatus as claimed in claim 16, wherein said passages extending outwardly from said exit orifices in said cavities extend outwardly, at angles less than 60 degrees, providing that each passage containing A glass joins with a passage containing B glass at a common orifice in said outer wall of said spinner peripheral side wall.

19. An apparatus as claimed in claim 17, wherein said passages extend outwardly either horizontally to the left or right towards said outer wall, or vertically up or down towards said outer wall, or obliquely in any direction towards said outer wall.

20. An apparatus as claimed in claim 16, wherein said common orifices in said outer wall of said spinner peripheral side wall are at least 2 times greater in number than said exit orifices in said cavities.

21. An apparatus as claimed in claim 17, wherein said common orifices in said outer wall of said spinner peripheral side wall are at least 3 times greater in number than said exit orifices in said cavities.

* * * * *